United States Patent
DeHaan

(10) Patent No.: US 9,021,470 B2
(45) Date of Patent: Apr. 28, 2015

(54) SOFTWARE PROVISIONING IN MULTIPLE NETWORK CONFIGURATION ENVIRONMENT

(75) Inventor: Michael Paul DeHaan, Morrisville, NC (US)

(73) Assignee: Red Hat, Inc., Raleigh, NC (US)

( * ) Notice: Subject to any disclaimer, the term of this patent is extended or adjusted under 35 U.S.C. 154(b) by 1113 days.

(21) Appl. No.: 12/202,194

(22) Filed: Aug. 29, 2008

(65) Prior Publication Data

US 2010/0054156 A1      Mar. 4, 2010

(51) Int. Cl.
*G06F 9/44* (2006.01)
*H04L 29/08* (2006.01)

(52) U.S. Cl.
CPC ............. *H04L 67/34* (2013.01); *H04L 67/30* (2013.01)

(58) Field of Classification Search
CPC .................................................. H04L 67/34
USPC .......................................................... 717/177
See application file for complete search history.

(56) References Cited

U.S. PATENT DOCUMENTS

| | | | |
|---|---|---|---|
| 5,787,246 A | 7/1998 | Lichtman et al. | |
| 5,835,719 A | 11/1998 | Gibson et al. | |
| 5,948,062 A | 9/1999 | Tzelnic et al. | |
| 6,105,100 A | 8/2000 | Dean et al. | |
| 6,212,585 B1 | 4/2001 | Chrabaszcz | |
| 6,243,747 B1 * | 6/2001 | Lewis et al. | 709/220 |
| 6,272,536 B1 | 8/2001 | van Hoff et al. | |
| 6,381,742 B2 | 4/2002 | Forbes et al. | |
| 6,415,289 B1 | 7/2002 | Williams et al. | |
| 6,438,711 B2 | 8/2002 | Woodruff | |
| 6,516,427 B1 | 2/2003 | Keyes et al. | |
| 6,526,442 B1 | 2/2003 | Stupek et al. | |
| 6,550,021 B1 | 4/2003 | Dalphy et al. | |
| 6,557,169 B1 | 4/2003 | Erpeldinger | |
| 6,594,664 B1 | 7/2003 | Estrada et al. | |
| 6,625,742 B1 | 9/2003 | Owhadi et al. | |
| 6,686,838 B1 | 2/2004 | Rezvani et al. | |
| 6,751,659 B1 | 6/2004 | Fenger et al. | |

(Continued)

OTHER PUBLICATIONS

Doc Searls "Linux for Suits", 2005, Specialized System Consultants Inc., vol. 2005.

(Continued)

*Primary Examiner* — Don Wong
*Assistant Examiner* — Theodore Hebert
(74) *Attorney, Agent, or Firm* — Lowenstein Sandler LLP

(57) ABSTRACT

Embodiments relate to systems and methods for provisioning software to machines in a set of diverse networks. A provisioning (or "cobbler") server can interact with a remote installation client to initiate a software provisioning process to machines installed on two or more diverse networks, such as local area, wide area, virtual private, or other networks. The remote installation clients in different networks can report the network interface types and configurations of their networks to the cobbler server. During provisioning, the administrator can specify one software distribution to the entire set of diverse networks, and the cobbler server can generate different distribution versions tailored to the network configurations of the various different networks. In embodiments, the cobbler server can maintain a set of network configuration templates to automatically set network settings such as static IP addresses, gateway information, hostname information, network mask information, and other settings for the different network types.

21 Claims, 4 Drawing Sheets

(56) References Cited

U.S. PATENT DOCUMENTS

| | | |
|---|---|---|
| 6,757,837 B1 | 6/2004 | Platt et al. |
| 6,769,022 B1 | 7/2004 | DeKoning et al. |
| 6,779,004 B1 | 8/2004 | Zintel |
| 6,845,464 B2 | 1/2005 | Gold |
| 6,865,737 B1 | 3/2005 | Lucas et al. |
| 6,947,939 B2 | 9/2005 | Fujibayashi et al. |
| 6,986,033 B2 | 1/2006 | Miyamoto et al. |
| 7,013,461 B2 | 3/2006 | Hellerstein et al. |
| 7,051,101 B1 | 5/2006 | Dubrovsky et al. |
| 7,107,330 B1 | 9/2006 | Hamilton et al. |
| 7,133,822 B1 | 11/2006 | Jacobson |
| 7,165,109 B2 | 1/2007 | Chiloyan et al. |
| 7,185,071 B2 | 2/2007 | Berg et al. |
| 7,200,845 B2 | 4/2007 | Morrison et al. |
| 7,240,102 B1* | 7/2007 | Kouznetsov et al. ......... 709/220 |
| 7,340,637 B2 | 3/2008 | Nagoya |
| 7,350,112 B2 | 3/2008 | Fox et al. |
| 7,356,679 B1 | 4/2008 | Le et al. |
| 7,395,322 B2* | 7/2008 | Harvey et al. .................. 709/220 |
| 7,421,484 B2* | 9/2008 | Das ................ 709/220 |
| 7,506,040 B1 | 3/2009 | Rabe et al. |
| 7,506,151 B2 | 3/2009 | Miyamoto et al. |
| 7,516,218 B2 | 4/2009 | Besson |
| 7,519,691 B2 | 4/2009 | Nichols et al. |
| 7,574,481 B2 | 8/2009 | Moore et al. |
| 7,600,005 B2 | 10/2009 | Jamkhedkar et al. |
| 7,606,868 B1 | 10/2009 | Le et al. |
| 7,640,325 B1 | 12/2009 | DeKoning et al. |
| 7,673,325 B2* | 3/2010 | Vincent et al. .................... 726/3 |
| 7,681,080 B2 | 3/2010 | Abali et al. |
| 7,716,316 B2 | 5/2010 | Nichols et al. |
| 7,734,717 B2 | 6/2010 | Saarimaki et al. |
| 7,827,261 B1 | 11/2010 | Griswold et al. |
| 7,831,997 B2 | 11/2010 | Eldar et al. |
| 7,849,460 B1* | 12/2010 | Martin et al. ................. 717/174 |
| 7,937,437 B2 | 5/2011 | Fujii |
| 2002/0062259 A1 | 5/2002 | Katz et al. |
| 2002/0078186 A1 | 6/2002 | Engel et al. |
| 2002/0138567 A1 | 9/2002 | Ogawa |
| 2002/0162028 A1 | 10/2002 | Kennedy |
| 2003/0005097 A1 | 1/2003 | Barnard et al. |
| 2003/0055919 A1 | 3/2003 | Fong et al. |
| 2003/0069884 A1 | 4/2003 | Nair et al. |
| 2003/0069946 A1 | 4/2003 | Nair et al. |
| 2003/0070110 A1 | 4/2003 | Aija et al. |
| 2003/0074549 A1 | 4/2003 | Paul et al. |
| 2003/0110173 A1 | 6/2003 | Marsland |
| 2003/0119480 A1 | 6/2003 | Mohammed |
| 2003/0126585 A1 | 7/2003 | Parry |
| 2003/0195921 A1 | 10/2003 | Becker et al. |
| 2003/0200149 A1* | 10/2003 | Gonzalez et al. ............... 705/26 |
| 2003/0212992 A1 | 11/2003 | Ronning et al. |
| 2004/0006616 A1 | 1/2004 | Quinn et al. |
| 2004/0015831 A1 | 1/2004 | Bowhill |
| 2004/0015957 A1 | 1/2004 | Zara et al. |
| 2004/0019876 A1 | 1/2004 | Dravida et al. |
| 2004/0024984 A1 | 2/2004 | Lanzatella et al. |
| 2004/0044643 A1 | 3/2004 | deVries et al. |
| 2004/0054789 A1 | 3/2004 | Breh et al. |
| 2004/0059703 A1 | 3/2004 | Chappell et al. |
| 2004/0064501 A1 | 4/2004 | Jan et al. |
| 2004/0128375 A1 | 7/2004 | Rockwell |
| 2004/0143664 A1 | 7/2004 | Usa et al. |
| 2004/0167975 A1 | 8/2004 | Hwang et al. |
| 2004/0215755 A1 | 10/2004 | O'Neill |
| 2004/0223469 A1 | 11/2004 | Bahl et al. |
| 2004/0226010 A1* | 11/2004 | Suorsa ........................ 717/174 |
| 2005/0028025 A1 | 2/2005 | Zalewski et al. |
| 2005/0050175 A1 | 3/2005 | Fong et al. |
| 2005/0114474 A1 | 5/2005 | Anderson et al. |
| 2005/0125525 A1 | 6/2005 | Zhou et al. |
| 2005/0149204 A1* | 7/2005 | Manchester et al. .............. 700/1 |
| 2005/0177829 A1 | 8/2005 | Vishwanath |
| 2005/0182796 A1 | 8/2005 | Chu et al. |
| 2005/0198629 A1 | 9/2005 | Vishwanath |
| 2005/0223374 A1 | 10/2005 | Wishart et al. |
| 2006/0041767 A1 | 2/2006 | Maxwell et al. |
| 2006/0080659 A1 | 4/2006 | Ganji |
| 2006/0095230 A1 | 5/2006 | Grier et al. |
| 2006/0095702 A1 | 5/2006 | Hickman et al. |
| 2006/0155857 A1 | 7/2006 | Feenan et al. |
| 2006/0173912 A1 | 8/2006 | Lindvall et al. |
| 2006/0174018 A1 | 8/2006 | Zhu et al. |
| 2006/0190575 A1 | 8/2006 | Harvey et al. |
| 2006/0190773 A1 | 8/2006 | Rao et al. |
| 2006/0200658 A1 | 9/2006 | Penkethman |
| 2006/0215575 A1 | 9/2006 | Horton et al. |
| 2006/0218544 A1 | 9/2006 | Chakraborty et al. |
| 2006/0230165 A1 | 10/2006 | Zimmer et al. |
| 2006/0282479 A1 | 12/2006 | Johnson et al. |
| 2007/0015538 A1 | 1/2007 | Wang |
| 2007/0067419 A1 | 3/2007 | Bennett |
| 2007/0101118 A1 | 5/2007 | Raghunath et al. |
| 2007/0118654 A1 | 5/2007 | Jamkhedkar et al. |
| 2007/0168721 A1 | 7/2007 | Luiro et al. |
| 2007/0169093 A1* | 7/2007 | Logan et al. .................... 717/168 |
| 2007/0192158 A1 | 8/2007 | Kim |
| 2007/0204338 A1 | 8/2007 | Aiello et al. |
| 2007/0226810 A1 | 9/2007 | Hotti |
| 2007/0244996 A1 | 10/2007 | Ahmed et al. |
| 2007/0254634 A1* | 11/2007 | Costa-Requena et al. . 455/412.1 |
| 2007/0276905 A1 | 11/2007 | Durand et al. |
| 2007/0288612 A1 | 12/2007 | Hall |
| 2007/0294376 A1 | 12/2007 | Ayachitula et al. |
| 2007/0299951 A1 | 12/2007 | Krithivas |
| 2008/0028048 A1 | 1/2008 | Shekar CS et al. |
| 2008/0040452 A1 | 2/2008 | Rao et al. |
| 2008/0040461 A1* | 2/2008 | Kumbalimutt et al. ........ 709/221 |
| 2008/0046708 A1 | 2/2008 | Fitzgerald et al. |
| 2008/0059959 A1 | 3/2008 | Chen et al. |
| 2008/0130639 A1 | 6/2008 | Costa-Requena et al. |
| 2008/0189693 A1 | 8/2008 | Pathak |
| 2008/0196043 A1 | 8/2008 | Feinleib et al. |
| 2008/0235266 A1 | 9/2008 | Huang et al. |
| 2008/0235361 A1 | 9/2008 | Crosbie et al. |
| 2008/0244325 A1 | 10/2008 | Tyulenev |
| 2008/0270674 A1 | 10/2008 | Ginzton |
| 2008/0294777 A1 | 11/2008 | Karve et al. |
| 2008/0301666 A1 | 12/2008 | Gordon et al. |
| 2008/0313716 A1 | 12/2008 | Park |
| 2008/0320110 A1 | 12/2008 | Pathak |
| 2009/0007091 A1* | 1/2009 | Appiah et al. ................. 717/171 |
| 2009/0055901 A1 | 2/2009 | Kumar et al. |
| 2009/0064132 A1 | 3/2009 | Suchy et al. |
| 2009/0089567 A1 | 4/2009 | Boland et al. |
| 2009/0089852 A1 | 4/2009 | Randolph et al. |
| 2009/0106291 A1 | 4/2009 | Ku et al. |
| 2009/0129597 A1 | 5/2009 | Zimmer et al. |
| 2009/0132682 A1 | 5/2009 | Counterman |
| 2009/0132710 A1 | 5/2009 | Pelley |
| 2009/0158148 A1 | 6/2009 | Vellanki et al. |
| 2009/0158272 A1 | 6/2009 | El-Assir et al. |
| 2009/0164522 A1 | 6/2009 | Fahey |
| 2009/0165099 A1 | 6/2009 | Eldar et al. |
| 2009/0172430 A1 | 7/2009 | Takenouchi |
| 2009/0240835 A1 | 9/2009 | Adelman et al. |
| 2009/0249296 A1* | 10/2009 | Haenel et al. ................. 717/120 |
| 2009/0259665 A1 | 10/2009 | Howe et al. |
| 2009/0265707 A1 | 10/2009 | Goodman et al. |
| 2009/0282404 A1 | 11/2009 | Khandekar et al. |
| 2009/0285199 A1 | 11/2009 | Strahs et al. |
| 2010/0023740 A1 | 1/2010 | Moon et al. |
| 2010/0054156 A1* | 3/2010 | DeHaan ........................ 370/255 |
| 2010/0083245 A1* | 4/2010 | DeHaan et al. ................ 717/177 |
| 2010/0100876 A1 | 4/2010 | Glover et al. |
| 2010/0217837 A1 | 8/2010 | Ansari et al. |
| 2010/0220584 A1 | 9/2010 | DeHaan et al. |
| 2010/0223504 A1 | 9/2010 | DeHaan et al. |
| 2010/0223608 A1 | 9/2010 | DeHaan et al. |
| 2010/0223609 A1 | 9/2010 | DeHaan et al. |

OTHER PUBLICATIONS

Grosse, "Repository Mirroring", 1995.
Butt et al., "Automated Installation of Large-Scale Linux Networks", 2000.

(56) References Cited

OTHER PUBLICATIONS

Agarwalla, "Automating Provisioning of Complete Software Stack in a Grid Environment", 2004.
Anderson et al., "Technologies for Large-Scale Configuration Management", Dec. 9, 2002.
eBook "Microsoft System Management Server 2003 Administrator's companion", Microsoft Press, c2004, Ch. 13, Patch Management, pp. 471-507.
DeHaan, "Systems and Methods for Providing Configuration Management Services from a Provisioning Server", U.S. Appl. No. 12/414,941, filed Mar. 31, 2009.
DeHaan, "Systems and Methods for Retiring Target Machines by a Provisioning Server", U.S. Appl. No. 12/475,427, filed May 29, 2009.
DeHaan, "Methods and Systems for Centrally Managing Multiple Provisioning Servers", U.S. Appl. No. 12/201,193, filed Aug. 29, 2008.
DeHaan, "Methods and Systems for Assigning Provisioning Servers in a Software Provisioning Environment", U.S. Appl. No. 12/201,646, filed Aug. 29, 2008.
DeHaan, "Methods and Systems for Providing Remote Software Provisioning to Machines", U.S. Appl. No. 12/195,633, filed Aug. 21, 2008.
DeHaan, "Systems and Methods for Storage Allocation in Provisioning of Virtual Machines", U.S. Appl. No. 12/202,178, filed Aug. 29, 2008.
DeHaan, "Methods and Systems for Providing Customized Actions Related to Software Provisioning", U.S. Appl. No. 12/200,552, filed Aug. 28, 2008.
DeHaan, "Methods and Systems for Automatically Locating a Provisioning Server", U.S. Appl. No. 12/198,290, filed Aug. 26, 2008.
DeHaan, "Methods and Systems for Managing Access in a Software Provisioning Environment", U.S. Appl. No. 12/201,832, filed Aug. 29, 2008.
DeHaan et al., "Methods and Systems for Importing Software Distributions in a Software Provisioning Environment", U.S. Appl. No. 12/200,631, filed Aug. 28, 2008.
DeHaan, "Methods and Systems for Managing Network Connections Associated with Provisioning Objects in a Software Provisioning Environment", U.S. Appl. No. 12/239,690, filed Sep. 26, 2008.
DeHaan, "Methods and Systems for Monitoring Software Provisioning", U.S. Appl. No. 12/198,378, filed Aug. 26, 2008.
DeHaan, "Systems and Methods for Differential Software Provisioning on Virtual Machines Having Different Configurations", U.S. Appl. No. 12/202,019, filed Aug. 29, 2008.
DeHaan, "Methods and Systems for Automatically Registering New Machines in a Software Provisioning Environment", U.S. Appl. No. 12/194,754, filed Aug. 20, 2008.
DeHaan, "Systems and Methods for Software Provisioning Machines Having Virtual Storage Resources", U.S. Appl. No. 12/202,189, filed Aug. 29, 2008.
DeHaan et al., "Methods and Systems for Managing Network Connections in a Software Provisioning Environment", U.S. Appl. No. 12/239,681, filed Sep. 26, 2008.
DeHaan et al., "Methods and Systems for Providing a Rescue Environment in a Software Provisioning Environment", U.S. Appl. No. 12/325,007, filed Nov. 28, 2008.
DeHaan et al., "Systems and Methods for Monitoring Hardware Resources in a Software Provisioning Environment", U.S. Appl. No. 12/325,056, filed Nov. 28, 2008.
DeHaan, "Methods and Systems for Providing Power Management Services in a Software Provisioning Environment", U.S. Appl. No. 12/277,518, filed Nov. 25, 2008.
DeHaan et al., "Methods and Systems for Providing Hardware Updates in a Software Provisioning Environment", U.S. Appl. No. 12/324,991, filed Nov. 28, 2008.
DeHaan et al., "Methods and Systems for Supporting Multiple Name Servers in a Software Provisioning Environment", U.S. Appl. No. 12/324,572, filed Nov. 26, 2008.
DeHaan et al., "Methods and Systems for Secure Gated File Deployment Associated with Provisioning", U.S. Appl. No. 12/393,754, filed Feb. 26, 2009.
DeHaan, "Systems and Methods for Integrating Software Provisioning and Configuration Management", U.S. Appl. No. 12/395,379, filed Feb. 27, 2009.
DeHaan, "Systems and Methods for Abstracting Software Content Management in a Software Provisioning Environment", U.S. Appl. No. 12/395,273, filed Feb. 27, 2009.
DeHaan et al., "Systems and Methods for Providing a Library of Virtual Images in a Software Provisioning Environment", U.S. Appl. No. 12/395,351, filed Feb. 27, 2009.
DeHaan et al., "Systems and Methods for Inventorying Un-Provisioned Systems in a Software Provisioning Environment", U.S. Appl. No. 12/391,588, filed Feb. 24, 2009.
DeHaan et al., "Systems and Methods for Managing Configurations of Storage Devices in a Software Provisioning Environment", U.S. Appl. No. 12/393,613, filed Feb. 26, 2009.
DeHaan et al., "Systems and Methods for Collecting and Altering Firmware Configurations of Target Machines in a Software Provisioning Environment", U.S. Appl. No. 12/393,319, filed Feb. 26, 2009.
DeHaan et al., "Methods and Systems for Replicating Provisioning Servers in a Software Provisioning Environment", U.S. Appl. No. 12/392,508, filed Feb. 25, 2009.
DeHaan, "Systems and Methods for Cloning Target Machines in a Software Provisioning Environment", U.S. Appl. No. 12/473,014, filed May 27, 2009.
DeHaan, "Methods and Systems for Provisioning Software", U.S. Appl. No. 11/763,315, filed Jun. 14, 2007.
DeHaan, "Methods and Systems for Provisioning Software", U.S. Appl. No. 11/763,333, filed Jun. 14, 2007.
HP Storage Essentials SRM 6.0 installation Guide. Jan. 2008. HP. 1st ed. Part No. T4283-96113. pp. 1-5, 97-136, 219-228.
HP Storage Essentials SRM 6.0 User Guide. Jan. 2008. HP, 1st ed. Part No. T4238-96114. pp. 1-83.
Michael DeHaan. "Unfiled Provisioning". 2007.
Michael DeHaan. "Provisioning With Cobbler". 2007.
Tan et al. "A WBEM Basked Disk Array Management Provider". 2005. IEEE. 2005 International Conference on Cyberworlds.
Lovelace et al, Managing Disk Subsystems using IBM TotalStorage Productivity Center. Sep. 2005. IBM. 2nd ed. SG24-7097-01. pp. 1-42.
DeHaan, "Systems and Methods for Message-Based Installation Management Using Message Bus", U.S. Appl. No. 12/495,077, filed Jun. 30, 2009.
Henson, "Systems and Methods for Integrating Storage Resources from Storage Area Network in Machine Provisioning Platform", U.S. Appl. No. 12/628,041, filed Nov. 30, 2009.
Henson, "Systems and Methods for Mounting Specified Storage Resources from Storage Area Network in Machine Provisioning Platform", U.S. Appl. No. 12/627,988, filed Nov. 30, 2009.

* cited by examiner

SOFTWARE PROVISIONING IN MULTIPLE NETWORK CONFIGURATION ENVIRONMENT

FIELD

The present teachings relate to systems and methods for software provisioning in a multiple network configuration environment, and more particularly to platforms and techniques generating and installing software installations to machines that may reside in a diverse network environment having different interfaces or standards.

BACKGROUND OF RELATED ART

Provisioning platforms are known which allow a systems administrator to select, configure, and push a set of software to new machines on a network. It is a shortcoming in existing provisioning platforms that the systems administrator may have to know beforehand the type of network interface or configuration in which the target machines are intended to operate, in order to set up the distribution. For example, the systems administrator may need to be aware that a given distribution is intended to be installed on a set of machines that are connected via an Ethernet LAN (local area network) in which each machine is running a certain version of the Unix™ operating system, in order to select a distribution template compatible with that network environment.

When faced with an installation project where the target network type or interface is unknown, or in which two or more heterogeneous networks will be present, conventional distribution platforms may be unable to perform an installation to all machines in that unknown or diverse environment.

It may be desirable to provide methods and systems for software provisioning in a multiple network interface environment, in which the distribution logic can detect and/or process diverse network types and automatically deliver properly configured software versions to the different network types, without a need for a systems administrator to manually perform or configure the installation for each separate network one by one.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for software provisioning in multiple network environments. More particularly, embodiments relate to platforms and techniques for software provisioning in multiple network environments, in which software images can be generated and deployed to a set of diverse or heterogeneous networks in an integrated installation process. In embodiments, a remote installation client can host a network engine which can manage the deployment of versions of the software distribution that are tailored to specific network types and configurations. In embodiments, the network management engine can receive inputs for the user indicating types of network configuration profiles to install on respective network types. In embodiments, the network management engine can in addition or instead perform a discovery process to automatically detect the types and configurations of the target networks for the software distribution, and use templates for the respective network interfaces to generate network-specific installations. The software provisioning can be carried out at times other than during a kickstart process. These and other embodiments described herein address the various noted shortcomings in known provisioning technology, and provide a network operator or other user with enhanced provisioning capability, without a need to manually inspect, assign and/or configure network interface types to various versions of the distribution, and/or repeat the installation process for each network interface type.

Reference will now be made in detail to exemplary embodiments of the present teachings, which are illustrated in the accompanying drawings. Where possible the same reference numbers will be used throughout the drawings to refer to the same or like parts.

Figure 1:
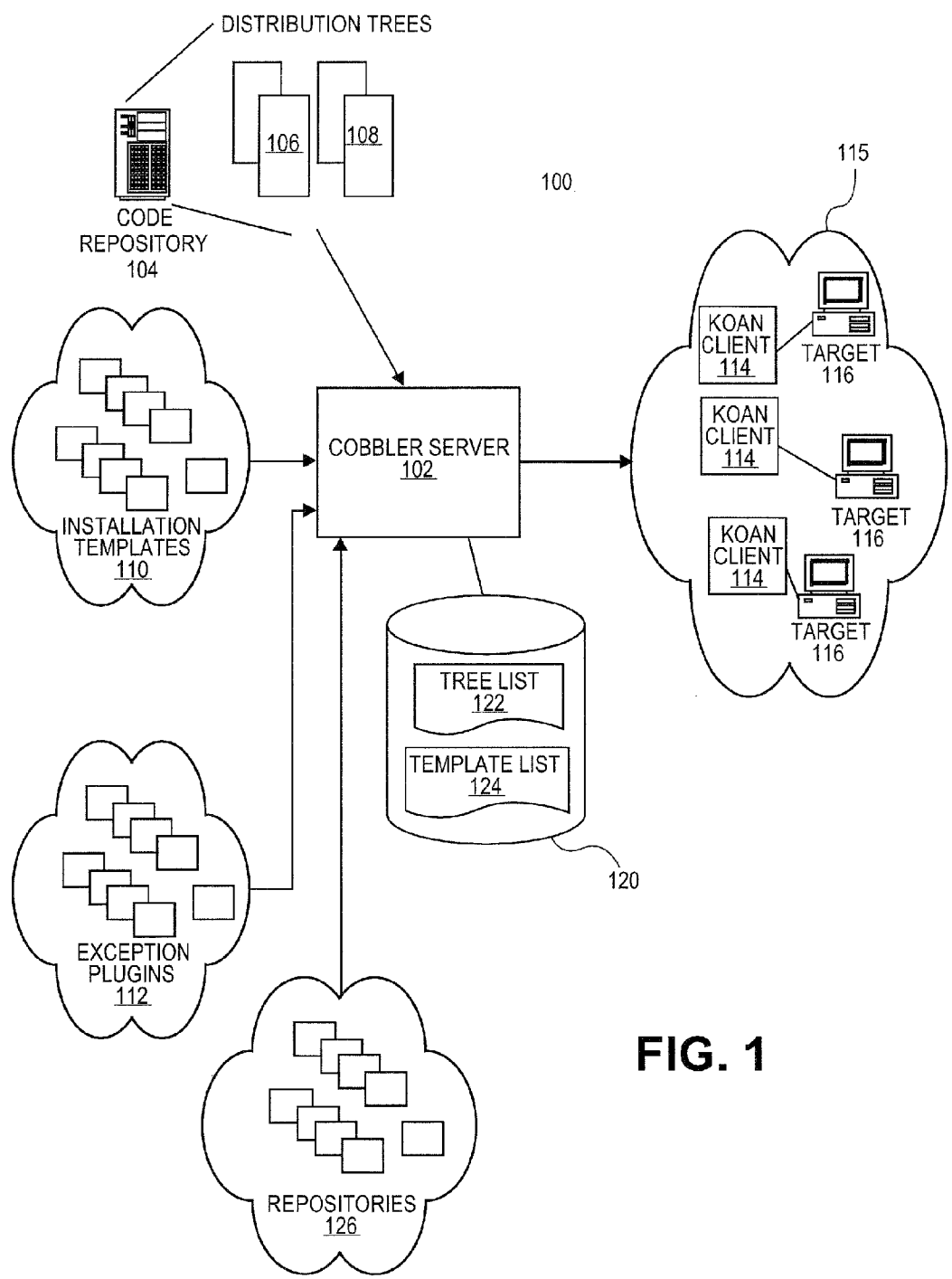
FIG. 1 illustrates an overall system for software provisioning in a multiple network configuration environment, according to various embodiments of the present teachings.

FIG. 1 illustrates an overall provisioning environment 100 consistent with systems and methods for storage allocation in the provisioning of virtual machines, according to various embodiments of the present teachings. Embodiments described herein can be implemented in or supported by the exemplary environment illustrated in FIG. 1. The provisioning environment 100 provides a unified provisioning environment, which comprehensively manages the tasks related to software provisioning.

In particular, the provisioning environment 100 can manage software provisioning using a hierarchy of commands. In exemplary embodiments, the hierarchy can include at least four levels of commands. The lowest level in the hierarchy can comprise distribution commands, which primarily handle base operating system specific tasks of provisioning. The second level can comprise profile commands, which associate a configuration file, such as a kickstart file for Linux or other operating system, with a distribution and optionally allow for customization. The third level comprises system commands, which associate remote systems that are involved with the provisioning of the software. The fourth level comprises repository commands, which address configurations and tasks related to updating the software, remote installation procedures, and optionally customizing the software.

The provisioning environment 100 provides several capabilities and advantages over the known provisioning solutions. For example, the present invention is capable of handling a variety of forms of installations, such as preboot execution environment ("PXE"), virtualization, re-installations, and image installations.

In exemplary aspects, the provisioning environment 100 enables integrating virtualization into a PXE provisioning infrastructure and provides several options to reinstall running machines as well. The provisioning environment 100 can integrate mirroring of package repositories with the provisioning process, so that a provisioning server may serve as a central mirror point of contract for all of an organization's software needs. In aspects, a set of remote mirrored repositories can automatically be used by provisioned systems without additional setup.

Reference will now be made in detail to the exemplary aspects the provisioning environment 100. The provisioning environment 100 can be applied to provisioning any form of software, such as Windows systems, UNIX systems, and Linux systems. In the exemplary description that follows, FIG. 1 is presented to explain the provisioning environment 100 for provisioning software, such as Linux, and Linux based software, such as Fedora and Red Hat Enterprise Linux by Red Hat, Inc.

In provisioning of software such as Linux, many system administrators use what is known as the "kickstart" installation method. Kickstart files are files that specify the intended configuration of the software being provisioned. Kickstart files can be kept on a server and can be read by individual computers during the installation. This installation method allows the use a single or relatively few standard kickstart files to install Linux on multiple machines, making it ideal for network and system administrators.

The kickstart file can be a simple text file, containing a list of items, each identified by a keyword. In general, a kickstart file can be edited with any text editor or word processor that can save files as ASCII text. One skilled in the art will recognize that the present invention may be applied to non-kickstart files in software provisioning. For example, configuration files such as AutoYAST Answer files used in Novell SuSe Linux and Sun Solaris Jumpstart files may also be used by the provisioning environment 100.

Typically, a kickstart file can be copied to the boot disk, or made available on the network. The network-based approach is most commonly used, as most kickstart installations for software provisioning, such as Linux systems, tend to be performed via a network using NFS, FTP, or HTTP on networked computers. Administrators also find it desirable that kickstart installations can be performed using a local CD-ROM, or a local hard drive.

Using kickstart files, a system administrator can create a single file containing the parameters that are needed to complete a typical software installation. For example, kickstart files specify parameters related to: language selection; mouse configuration; keyboard selection; boot loader installation; disk partitioning; network configuration; NIS, LDAP, Kerberos, Hesiod, and Samba authentication; firewall configuration; and package selection.

According to exemplary aspects illustrated in FIG. 1, the provisioning environment 100 can include a provisioning server 102, a code repository 104 which provides access to distributions 106 and 108, a set of installation templates 110, a set of exception plugins 112, a helper client 114 running on target machines 116 in a network 115, a provisioning database 120 which comprises a distribution tree list 122 and template list 124. Each of these components will now be further described.

The provisioning server (from herein referred to as a "cobbler") 102 is responsible for: serving as a extensible markup language remote procedure call (XMLRPC) handler; linking to or mirroring install distribution trees and a configuration database; hosting kickstart templates; hosting plugins, generating installation images, and the like. The cobbler server 102 can be implemented as software, such as Python code, installed on a boot server machine and provides a command line interface for configuration of the boot server. In addition, the cobbler server 102 can make itself available as a Python application programming interface (API) for use by higher level management software (not shown). The cobbler server 102 supports provisioning via PXE, image (ISO) installation, virtualization, reprovisioning. As will be described later, the last two modes are performed with the assistance of a helper client 114.

The code repository 104 is responsible for hosting distributions 106 and 108. The code repository 104 may be implemented using well known components of hardware and software. Additionally, the code repository 104 can be or include one or more repositories hosting distributions. The distributions 106 and 108 can include bundles of software that is already compiled and configured. The distributions 106 and 108 may be in the form of either rpm, deb, tgz, msi, exe formats, and the like. For example, as Linux distributions, the distributions 106 and 108 are bundles of software that comprise the Linux kernel, the non-kernel parts of the operating system, and assorted other software. The distributions 106 and 108 can take a variety of forms, from fully-featured desktop and server operating systems to minimal environments.

In exemplary aspects, the installation templates 110 are any data structure or processing element that can be combined with a set of installation configurations and processed to produce a resulting configuration file, such as a kickstart file.

In exemplary aspects, exception plugins 112 is software that interacts with cobbler server 102 to customize the provisioning of software. In general, the exceptions plugins 112 are intended to address infrequent customization needs.

In exemplary aspects, the helper client (known as "koan", which stands for "kickstart-over-a-network") 114 can assist the cobbler server 102 during the provisioning processes. The koan 114 can allow for both network provisioning of new virtualized guests and destructive provisioning of any existing system. When invoked, the koan 114 can request profile information from a remote boot server that has been configured with the cobbler server 102. In some aspects, what the koan 114 does with the profile data depends on whether it was invoked with -virt or -replace-self.

In exemplary aspects, the koan 114 can enable replacing running systems as well as installing virtualized profiles. The koan 114 can also be pushed out to systems automatically from the boot server. In some aspects, the koan client 114 is also written in Python code to accommodate a variety of operating systems, machine architectures, etc.

In exemplary aspects, the network 115 can include a number of the target machines 116. The target machines 116 can represent the particular machines to which software provisioning is directed. The target machines 116 may represent a wide variety of computing devices, such as personal computers, servers, laptop computers, personal mobile devices, and the like. In some aspects, the target machines 116 can represent distributed computing environments such as cloud computing environments. Although FIG. 1 shows several of the target machines 116, the provisioning environment 100 can be capable of managing a wide range of environments, such as datacenters with thousands of machines or server pools with just a few machines. Additionally, the cobbler server 102 can be connected to multiple networks 115.

In exemplary aspects, the provisioning database 120 can serve as a data storage location for holding data used by the cobbler server 102. For example, as shown, the provisioning database 120 can comprise the distribution tree list 122 and the template list 124. The distribution tree list 122 can provide an inventory of the distributions 106 and 108 that are hosted or mirrored by the cobbler server 102. The template list 124 can provide an inventory of the templates 110 that are hosted by the cobbler server 102.

As noted above, the cobbler server 102 can manage provisioning using a hierarchical concept of distribution commands, profile commands, system commands, and repository commands. This framework enables the cobbler server 102 to abstract the differences between multiple provisioning types (installation, reinstallation, and virtualization) and allows installation of all three from a common platform. This hierarchy of commands also permits the cobbler server 102 to integrate software repositories 126 with the provisioning process, thus allowing systems to be configured as a mirror for software updates and third party content as well as distribution content.

Distributions can contain information about base operating system tasks, such as what kernel and initial ramdisk ("initrd") are used in the provisioning, along with other information, such as required kernel parameters. Profiles associate one of the distributions 106 and 108 with a kickstart file and optionally customize it further, for example, using plugins 112. Systems commands associate a hostname, IP, or MAC with a distribution and optionally customize the profile further. Repositories contain update information, such as yum mirror information that the cobbler server 102 uses to mirror repository 104. The cobbler server 102 can also manage (generate) DHCP configuration files using the templates 110.

In exemplary aspects, the cobbler server 102 can use a provisioning environment that is fully templated, allowing for kickstarts and PXE files to be customized by the user. The cobbler server 102 uses the concept of "profiles" as an intermediate step between the operating system and the installed system. A profile is a description of what a system does rather than the software to be installed. For instance, a profile might describe a virtual web server with X amount of RAM, Y amounts of disk space, running a Linux distribution Z, and with an answer file W.

In exemplary aspects, the cobbler server 102 can provide a command line interface to configure a boot server in which it is installed. For example, the format of the cobbler server 102 commands can be generally in the format of: cobbler command [subcommand] [—arg1=] [—arg2=]. Thus, a user can specify various aspects of software provisioning via a single interface, such as a command line interface or other known interface. Examples of exemplary cobbler commands can be found in U.S. patent application Ser. No. 11/763,315, U.S. Patent Application Publication No. 2008/0288938 and U.S. patent application Ser. No. 11/763,333, U.S. Patent Application Publication No. 2008/0288939, the disclosures of which are incorporated herein, in their entirety, by reference.

According to exemplary aspects, a user can use various commands of the provisioning environment 100 to specify distributions and install trees hosted by the code repository 104, such as a distribution from the distributions 106 or 108. A user can add or import a distribution or import it from installation media or an external network location.

According to exemplary aspects, in order to import a distribution, the cobbler server 102 can auto-add distributions and profiles from remote sources, whether this is an installation media (such as a DVD), an NFS path, or an rsync mirror. When importing a rsync mirror, the cobbler server 102 can try to detect the distribution type and automatically assign kickstarts. By default in some embodiments, the cobbler server can provision by erasing the hard drive, setting up eth0 for DHCP, and using a default password. If this is undesirable, an administrator may edit the kickstart files in /etc/cobbler to do something else or change the kickstart setting after the cobbler server 102 creates the profile.

According to exemplary aspects, a user may map profiles to the distributions and map systems to the profiles using profile commands and systems commands of the provisioning environment 100. A profile associates a distribution to additional specialized options, such as a kickstart automation file. In the cobbler server 102, profiles are the unit of provisioning and at least one profile exists for every distribution to be provisioned. A profile might represent, for instance, a web server or desktop configuration.

According to exemplary aspects, a user can map systems to profiles using system commands. Systems commands can assign a piece of hardware with cobbler server 102 to a profile. Systems can be defined by hostname, Internet Protocol (IP) address, or MAC address. When available, use of the MAC address to assign systems can be preferred.

According to exemplary aspects, the user can map repositories and profiles using repository commands. Repository commands can address configurations and tasks related to updating the software, remote installation procedures, and optionally customizing the software. These repository commands can also specify mirroring of the provisioned software to remote servers. Repository mirroring can allow the cobbler server 102 to not only mirror/install the trees 106 and 108, but also optional packages, third party content, and updates. Mirroring can be useful for faster, more up-to-date installations and faster updates, or providing software on restricted networks. The cobbler server 102 can also include other administrative features, such as allowing the user to view their provisioning configuration or information tracking the status of a requested software installation.

According to exemplary aspects, a user can utilize commands to create a provisioning infrastructure from a distribution mirror. Then a default PXE configuration is created, so that by default systems will PXE boot into a fully automated install process for that distribution. The distribution mirror can be a network rsync mirror or a mounted DVD location.

According to exemplary aspects, the administrator uses a local kernel and initrd file (already downloaded), and shows how profiles would be created using two different kickstarts—one for a web server configuration and one for a database server. Then, a machine can be assigned to each profile.

According to exemplary aspects, a repo mirror can be set up for two repositories, and create a profile that will auto install those repository configurations on provisioned systems using that profile.

According to exemplary aspects, in addition to normal provisioning, the cobbler server 102 can support yet another option, called "enchant". Enchant takes a configuration that has already been defined and applies it to a remote system that might not have the remote helper program installed. Users might want to use this command to replace a server that is being repurposed, or when no PXE environment can be created. Thus, the enchant option allows the remote the koan client 114 to be executed remotely from the cobbler server 102.

According to aspects, if the cobbler server 102 is configured to mirror certain repositories, the cobbler server 102 can then be used to associate profiles with those repositories. Systems installed under those profiles can be auto configured to use these repository mirrors in commands and, if supported, these repositories can be leveraged. This can be useful for a large install base, fast installation and upgrades for systems are desired, or software not in a standard repository exists and provisioned systems are desired to know about that repository.

According to exemplary aspects, the cobbler server 102 may also keep track of the status of kickstarting machines. For example, the "cobbler status" will show when the cobbler server 102 thinks a machine started kickstarting and when it last requested a file. This can be a desirable way to track machines that may have gone inactive during kickstarts. The cobbler server 102 can also make a special request in the post section of the kickstart to signal when a machine is finished kickstarting.

According to exemplary aspects, for certain commands, the cobbler server 102 will create new virtualized guests on a machine in accordance to the orders from the cobbler server 102. Once finished, an administrator may use additional commands on the guest or other operations. The cobbler server 102 can automatically name domains based on their MAC addresses. For re-kickstarting, the cobbler server 102 can reprovision the system, deleting any current data and replacing it with the results of a network install.

According to exemplary aspects, the cobbler server 102 can configure boot methods for the provisioning requested by the user. For example, the cobbler server 102 can configure a PXE environment, such as a network card BIOS. Alternatively, the cobbler server 102 can compile and configure information for koan client 104. The cobbler server 102 can also optionally configured DHCP and DNS configuration information.

According to exemplary aspects, the cobbler server 102 can serve the request of the koan client 114. The koan client 114 can acknowledge the service of information of the cobbler server 102 and then can initiate installation of the software being provisioned. Additionally, the koan client 114 can either install the requested software, e.g., replace the existing operating system, or install a virtual machine.

Figure 2:
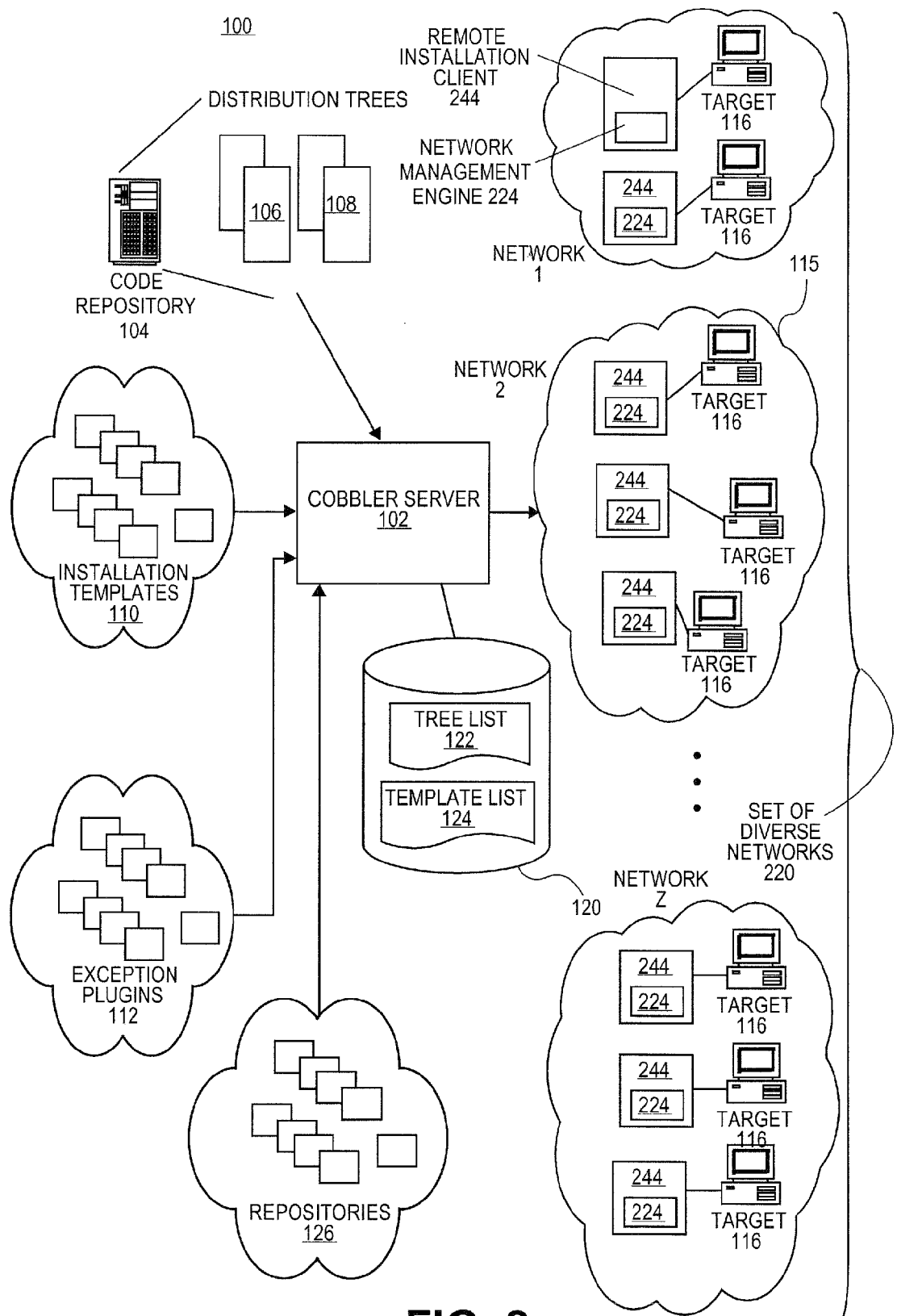
FIG. 2 illustrates an overall system for software provisioning in a multiple network configuration environment, including identification or discrimination of different network configuration types to allow differentiation of distribution images based on network interface types, according to various embodiments.

FIG. 2 illustrates an overall network 100 consistent with systems and methods for software provisioning in multiple network environments, according to various aspects of the present teachings in further regards. In embodiments as shown, a set of diverse networks 220 can communicate with cobbler server 102 to initiate a software provisioning or distribution process. The provisioning can be initiated by the request of a systems administrator, or other user. The set of diverse networks 220 can include a set of two or more diverse network configurations or types, each with a set of targets 116 and one or more remote installation clients 244 in each different or distinct network type. Set of diverse networks 220 can contain or include, for example, any two or more of a personal area network, a local area network, a metropolitan area network, a wide area network, the Internet, an intranet, an extranet, a virtual private network, a peer-to-peer network, and a wireless self-configuring network. Other network types are possible.

Each network type or category within set of diverse networks 220 can have a different set of physical or media-level specifications or parameters, as well as other settings and configurations. Each network can have a separate or distinct set of interface and/or configuration parameters, including, for instance, static IP (Internet protocol) addresses or other information, gateway addresses or other information, hostname information, netmask information, and other network settings. Other network settings can further include port configuration settings, physical layer specification settings, data link layer specification settings, network layer specification settings, transport layer specification settings, security or encryption settings, and user authentication settings. Because the requirements and specifications for each distinct network type may be different, cobbler server 102 may not be able to generate identical distribution(s) 106, 108 to each network in set of diverse networks 220. Instead, cobbler server 102 can generate a tailored or specific version of distribution(s) 106, 108 to respective different networks in set of diverse networks 220, depending on particular requirements of each.

In embodiments, cobbler server 102 can access a set of installation templates 110 containing configuration details for each different network to be integrated into the various networks in set of diverse networks 220. In embodiments, the systems administrator or other user can specify or indicate different network types to be located within set of diverse networks 220. In embodiments, one or more network management engine 224 hosted in the set of remote installation clients 244 can in addition or instead perform an automatic detection or discovery process, to report the network configuration types/interface parameters for the different networks in set of diverse networks 220 to cobbler server 102. In embodiments, the systems administrator or other user can view, update, override, or otherwise modify the network configuration parameters that are automatically detected or generated by the network management engine 224 of the remote installation clients 244. In embodiments, the automatically detected network configuration/interface data can be used to initiate software provisioning, with no further modification or intervention.

When the set of installation templates 110 are generated, cobbler server 102 can generate distributions(s) 106, 108 to the different networks in set of diverse networks 220 based on corresponding network interface parameters, and transmit those distributions to the different networks in set of diverse networks 220. Installation of the distribution can proceed via the remote installation clients 244 and network management engine 224 located in each different network. In embodiments, the distribution(s) 106, 108 can be or include an operating system, applications, or other software. When initial installation is complete, testing or verification of the installation can be performed via network management engine 224 and/or other logic. In embodiments, network management engine 224 or other resources can continue to monitor the constituent networks of set of diverse networks after completion of the software provisioning, for example to monitor for changes to network configuration and report those changes to cobbler server 102 or otherwise. In embodiments in various regards, a systems administrator or other user therefore need not manually detect, configure, and/or assign network configuration settings to individual sets of machines in diverse networks as they are provisioned or updated.

Figure 3:
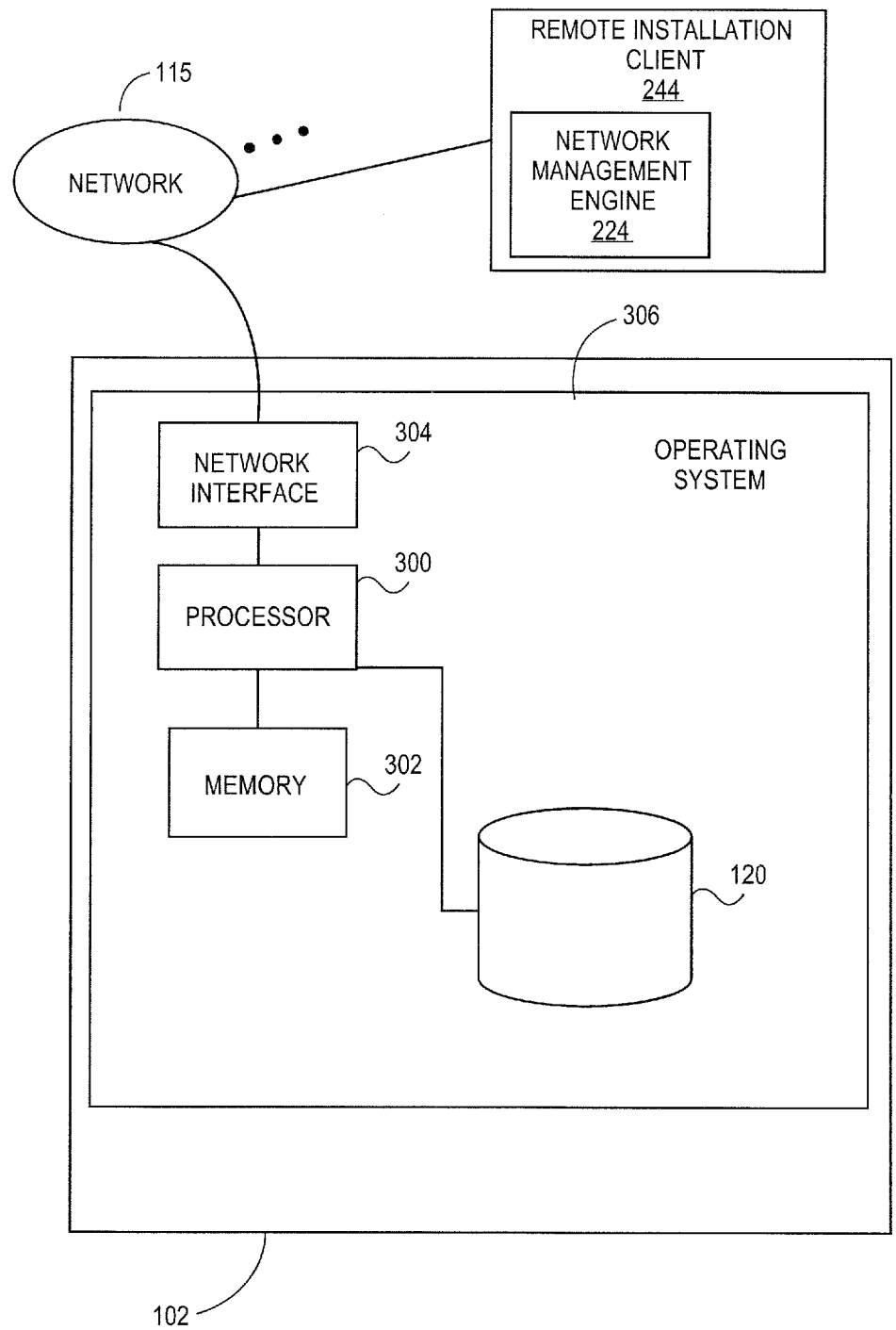
FIG. 3 illustrates an exemplary hardware configuration for a provisioning server and related resources that can be used to configure and install software packages in a network, according to various embodiments.

FIG. 3 illustrates an exemplary diagram of hardware and other resources that can be incorporated in the cobbler server 102 configured to communicate with the network 115 and the target machines 116 in network 115, according to embodiments. In embodiments as shown, the cobbler server 102 can comprise a processor 300 communicating with memory 302, such as electronic random access memory, operating under control of or in conjunction with operating system 306. Operating system 306 can be, for example, a distribution of the Linux™ operating system, the Unix™ operating system, or other open-source or proprietary operating system or platform. Processor 300 also communicates with the provisioning database 120, such as a database stored on a local hard drive. While illustrated as a local database in the cobbler server 102, the provisioning database 120 can be separate from the cobbler server 102 and the cobbler server 102 can be configured to communicate with the remote provisioning database 120.

Processor 300 further communicates with network interface 304, such as an Ethernet or wireless data connection, which in turn communicates with one or more networks 115, such as the Internet or other public or private networks. Processor 300 also communicates with the provisioning database 120, the network management engine 224 and other resources to execute control logic and perform the storage allocation and provisioning processes described herein. Other configurations of the cobbler server 102, associated network connections, and other hardware and software resources are possible.

While FIG. 3 illustrates the cobbler server 102 as a standalone system comprising a combination of hardware and software, the cobbler server 102 can also be implemented as a software application or program capable of being executed by a convention computer platform. Likewise, the cobbler server 102 can also be implemented as a software module or program module capable of being incorporated in other software applications and programs. In either case, the cobbler server 102 can be implemented in any type of conventional proprietary or open-source computer language.

Figure 4:
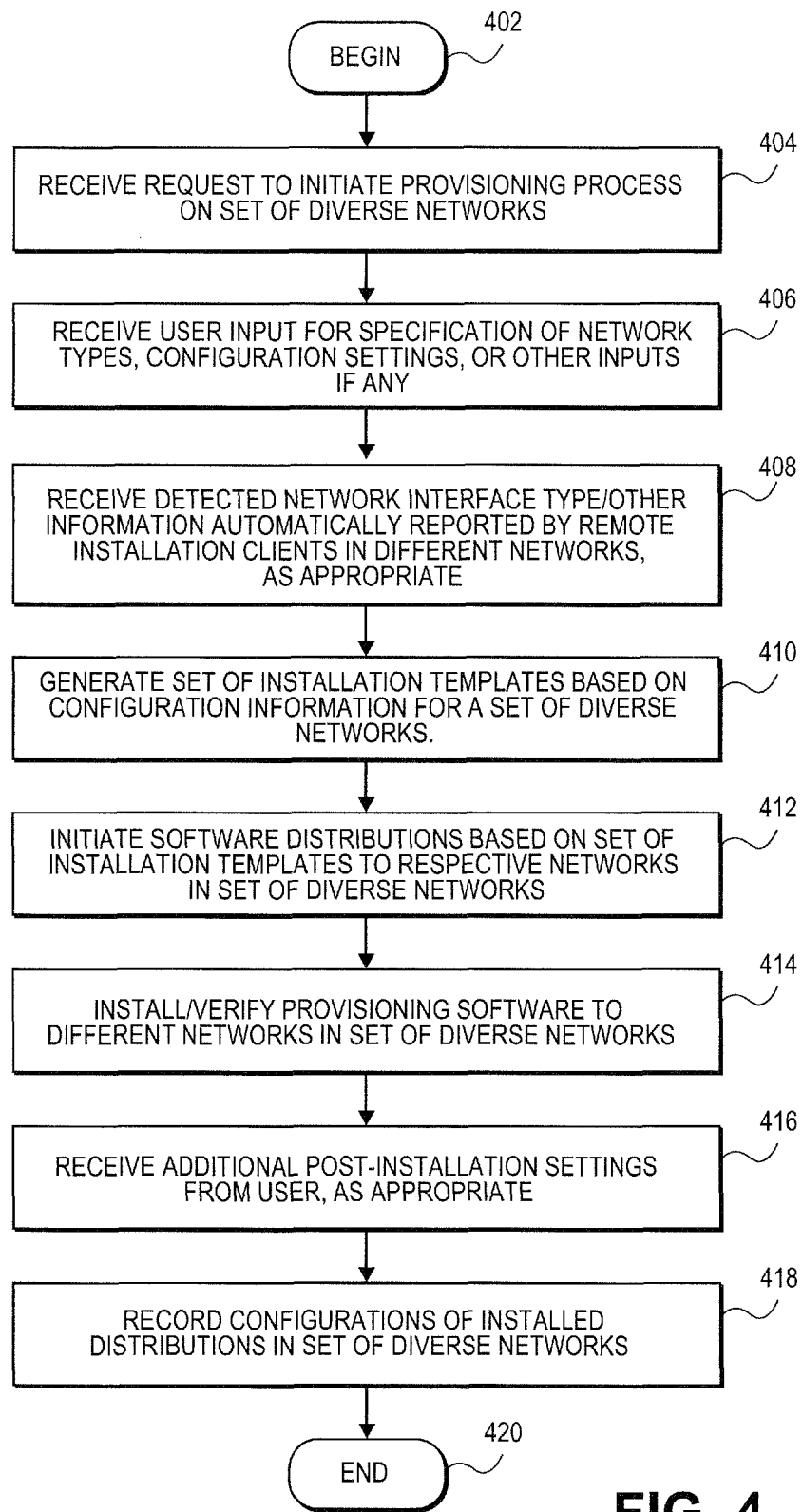
FIG. 4 illustrates a flowchart of overall processing for software provisioning in a multiple network configuration environment, according to various embodiments.

FIG. 4 illustrates overall provisioning and storage allocation processing in systems and methods for software provisioning in multiple network environments, according to various embodiments of the present teachings. In 402, processing can begin. In 404, a request to initiate a software provisioning process on a set of diverse networks 220 can be received in cobbler server 102. In 406, input can be received from a systems administrator or other user for the specification of network types, configuration settings or other inputs or settings to be used in the provisioning process, if any. In 408, the cobbler server 102 can receive detected network interface types or other network configuration information automatically reported by the set of remote installation clients 244 in different networks of set of diverse networks 220, as appropriate. For instance, one or more remote installation client 244 in one or more different network of set of diverse networks 220 can capture and report a network type, such as a local area network, wide area network, or other type of network and/or network interface to cobbler server 102. In 410, the cobbler server 102 can generate a set of installation templates 110 based on the received configuration information or other attributes of set of diverse networks 220.

In 412, cobbler server 102 can initiate the delivery of software distributions 106, 108 to set of diverse networks 220 based on the generated set of installation templates 110 to respective different networks in set of diverse networks 220. Thus, for example, one network may receive distribution(s) 106, 108 with software configured to communicate via port 1021 using TCP/IP (transport control protocol/Internet protocol), while another receive distribution(s) 106, 108 with software configured to communicate via port 434 using ftp (file transfer protocol). Other configurations can be used. In 414, distribution(s) 106, 108 can be installed to and/or verified on the different networks of the set of diverse networks 220. In 416, cobbler server 102 can receive additional post-installation settings from the systems administrator or other user, as appropriate. In 418, the configurations and other data associated with the installed distribution(s) 106, 108 provisioned to set of diverse networks 220 can be recorded or stored to provisioning database 120 or otherwise. In 420, processing can repeat, return to a prior processing point, jump to a further processing point, or end.

The foregoing description is illustrative, and variations in configuration and implementation may occur to persons skilled in the art. For example, while embodiments have been described in which software provisioning to set of diverse networks 220 can be generated via a single cobbler server 102, in embodiments multiple provisioning or cobbler servers can be used. For further example, while embodiments have been described in which different network types receive different distribution(s) 106, 108, in embodiments different networks can receive the same version of distributions 106, 108, depending on possible inter-network compatibilities or other factors. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   identifying a resource associated with a target machine;
   determining a function to be performed by the target machine in view of the identified resource associated with the target machine;
   receiving, from the target machine, a request for a profile;
   generating, by a processor, the profile, wherein the profile associates a software distribution with the function to be performed by the target machine, and wherein the profile links a configuration file to the software distribution;
   receiving a request for the initiation of a software provisioning process on a plurality of different networks, wherein each of the plurality of different networks comprises a respective network interface type;
   for a first different network in the plurality of different networks:
      receiving, from a network management engine in the first different network, a network interface type for the first different network,
      communicating with a remote installation client in the first different network to provision software to a plurality of machines in the first different network, and
      generating a distribution configuration for the first different network in view of the network interface type for the first different network, wherein the distribution configuration for the first different network comprises a first software to communicate using a first network communication protocol; and
   for a second different network in the plurality of different networks:
      receiving, from a network management engine in the second different network, a network interface type for the second different network,
      communicating with a remote installation client in the second different network to provision software to a plurality of machines in the second different network, and
      generating a distribution configuration for the second different network in view of the network interface type for the second different network, wherein the distribution configuration for the second different network comprises a second software to communicate using a second network communication protocol.

2. The method of claim 1, wherein the plurality of different networks comprise two of a personal area network, a local area network, a metropolitan area network, a wide area network, an intranet, an extranet, a virtual private network, a peer-to-peer network, or a wireless self-configuring network.

3. The method of claim 1, wherein the distribution configuration for the first different network is generated in view of one of a plurality of configuration templates, wherein each of the configuration templates being associated with the respective network interface type.

4. The method of claim 3, wherein the plurality of configuration templates comprises one of static IP (Internet protocol) information, gateway information, hostname information, netmask information, a port configuration setting, a physical layer specification setting, a data link layer specification setting, a network layer specification setting, a transport layer specification setting, an encryption setting, or a user authentication setting.

5. The method of claim 1, wherein the provisioned software comprises one of an operating system software or an application software.

6. The method of claim 1, wherein the network interface type for a network of the plurality of different networks is configured via user input.

7. The method of claim 1, wherein the network interface type for a network of the plurality of different networks is configured via an automatic detection process.

8. A system, comprising:
a memory; and
a processor, operatively coupled to the memory, to:
identify a resource associated with a target machine;
determine a function to be performed by the target machine in view of the identified resource associated with the target machine;
receive, from the target machine, a request for a profile;
generate the profile, wherein the profile associates a software distribution with the function to be performed by the target machine, and wherein the profile links a configuration file to the software distribution;
receive a request for the initiation of a software provisioning process on a plurality of different networks;
for a first different network in the plurality of different networks:
receive, from a network management engine in the first different network, a network interface type for the first different network,
communicate with a remote installation client in the first different network to provision software to a plurality of machines in the first different network, and
generate a distribution configuration for the first different network in view of the network interface type for the first different network, wherein the distribution configuration for the first different network comprises a first software to communicate using a first network communication protocol; and
for a second different network in the plurality of different networks:
receive, from a network management engine in the second different network, a network interface type for the second different network,
communicate with a remote installation client in the second different network to provision software to a plurality of machines in the second different network, and
generate a distribution configuration for the second different network in view of the network interface type for the second different network, wherein the distribution configuration for the second different network comprises a second software to communicate using a second network communication protocol.

9. The system of claim 8, wherein the plurality of different networks comprise two of a personal area network, a local area network, a metropolitan area network, a wide area network, an intranet, an extranet, a virtual private network, a peer-to-peer network, or a wireless self-configuring network.

10. The system of claim 8, wherein the distribution configuration for the first different network is generated in view of one of a plurality of configuration templates, wherein each of the configuration templates being associated with the respective network interface type.

11. The system of claim 10, wherein the plurality of configuration templates comprises one of static IP (Internet protocol) information, gateway information, hostname information, netmask information, a port configuration setting, a physical layer specification setting, a data link layer specification setting, a network layer specification setting, a transport layer specification setting, an encryption setting, or a user authentication setting.

12. The system of claim 8, wherein the provisioned software comprises one of an operating system software or an application software.

13. The system of claim 8, wherein the network interface type for a network of the plurality of different networks is configured via user input.

14. The system of claim 8, wherein the network interface type for a network of the plurality of different networks is configured via an automatic detection process.

15. A plurality of different networks, communicably coupled to a processor, the processor to:
identify a resource associated with a target machine;
determine a function to be performed by the target machine in view of the identified resource associated with the target machine;
receive, from the target machine, a request for a profile;
generate the profile, wherein the profile associates a software distribution with the function to be performed by the target machine, and wherein the profile links a configuration file to the software distribution;
receive a request for the initiation of a software provisioning process on the plurality of different networks;
for a first different network in the plurality of different networks:
receive, from a network management engine in the first different network, a network interface type for the first different network,
communicate with a remote installation client in the first different network to provision software to a plurality of machines in the first different network, and
generate a distribution configuration for the first different network in view of the network interface type for the first different network, wherein the distribution configuration for the first different network comprises a first software to communicate using a first network communication protocol; and
for a second different network in the plurality of different networks:
receive, from a network management engine in the second different network, a network interface type for the second different network,
communicate with a remote installation client in the second different network to provision software to a plurality of machines in the second different network, and
generate a distribution configuration for the second different network in view of the network interface type for the second different network, wherein the distribution configuration for the second different network comprises a second software to communicate using a second network communication protocol.

16. The plurality of different networks of claim 15, wherein the plurality of different networks comprise two of a personal area network, a local area network, a metropolitan area network, a wide area network, an intranet, an extranet, a virtual private network, a peer-to-peer network, or a wireless self-configuring network.

17. The plurality of different networks of claim 15, wherein the distribution configuration for the first different network is generated in view of one of a plurality of configuration templates, wherein each of the configuration template templates being associated with the respective network interface type.

18. The plurality of different networks of claim 17, wherein the plurality of configuration templates comprises one of static IP (Internet protocol) information, gateway information, hostname information, netmask information, a port configuration setting, a physical layer specification setting, a data link layer specification setting, a network layer specification setting, a transport layer specification setting, an encryption setting, or a user authentication setting.

19. The plurality of different networks of claim 15, wherein the provisioned software comprises one of an operating system software or an application software.

20. The plurality of different networks of claim 15, wherein the network interface type for a network of the plurality of different networks is configured via user input.

21. The plurality of different networks of claim 15, wherein the network interface type for a network of the plurality of different networks is configured via an automatic detection process.

\* \* \* \* \*